United States Patent [19]

Kuroiwa

[11] Patent Number: 4,799,809

[45] Date of Patent: Jan. 24, 1989

[54] ROLLING BEARING WITH ROLLING RETAINER MEMBERS

[76] Inventor: Kazuo Kuroiwa, 750-186, Shirane-cho, Asahi-ku, Yokohama-shi, Kanagawa-ken, Japan

[21] Appl. No.: 108,778

[22] Filed: Oct. 15, 1987

[30] Foreign Application Priority Data

Oct. 15, 1986 [JP] Japan ................ 61-243071

[51] Int. Cl.$^4$ ............ F16C 19/20; F16C 19/40; F16C 33/10

[52] U.S. Cl. ................... 384/522; 384/475; 384/553

[58] Field of Search ............ 384/462, 465, 470, 472, 384/474, 475, 520–523, 551–555, 572, 524

[56] References Cited

U.S. PATENT DOCUMENTS

| | | | |
|---|---|---|---|
| 638,863 | 12/1899 | Chatham | 384/553 |
| 952,358 | 3/1910 | Ramslie | 384/522 |
| 1,282,888 | 10/1918 | Lippincott | 384/522 |
| 3,124,396 | 3/1964 | Barager | 384/522 |
| 3,531,167 | 9/1970 | Edge et al. | 384/475 |
| 4,174,141 | 11/1979 | Reiss | 384/554 |

FOREIGN PATENT DOCUMENTS

| | | | |
|---|---|---|---|
| 97055 | 5/1924 | Austria | 384/521 |
| 826676 | 1/1952 | Fed. Rep. of Germany | 384/521 |
| 487647 | 7/1918 | France | 384/551 |
| 50402 | 11/1921 | Sweden | 384/521 |
| 149588 | 8/1920 | United Kingdom | 384/551 |

Primary Examiner—Daniel P. Stodola
Assistant Examiner—Thomas R. Hannon
Attorney, Agent, or Firm—Wegner & Bretschneider

[57] ABSTRACT

This rolling bearing includes an inner race, an outer race, rolling members—either balls or rollers—disposed between these races and rotatably supporting them relative to one another, and generally cylindrical retainers disposed between these rolling members, each rolling on its two adjacent rolling members and keeping them apart. Each retainer has an axially central portion rollingly contacting with these two adjacent rolling members, a pair of circumferential grooves each near one of its ends, and a pair of disk shaped end portions each near one of its ends. These retainers are positioned by their disk shaped end portions rolling on the one radial sides of support rails defined on a pair of covers mounted each at one axial end of one race, and by their grooves being engaged over the other radial sides of free rings each at one bearing axial end. The retainers either may roll on the radially outer sides of the rails and on the radially inner sides of the rings, or vice versa. The covers may be mounted to the inner or outer race. Radial play may be available for the retainers between the rails and rings. The center line of each retainer and the locuses of symmetry of the two adjacent rolling members may be coplanar. The thickness of the rings may be greater remote from where they contact the grooves of the retainers than proximate thereto. A device may be provided for impelling lubricant through the space between the races.

10 Claims, 10 Drawing Sheets

ROLLING BEARING WITH ROLLING RETAINER MEMBERS

BACKGROUND OF THE INVENTION

The present invention relates to a rolling bearing, by which is meant either a roller type bearing or a ball type bearing, and particularly relates to a rolling bearing in which balls or rollers thereof are provided between an inner race member and an outer race member thereof, and are spaced apart by means of rolling retainer members which are shaped as rollers.

In the prior art, there have been proposed various types of rolling bearing. Typically such a bearing has included an inner race member and an outer race member, and between these race members there have been fitted a number of rolling members, either balls or rollers. In order to keep these rolling members in good order and properly positioned, and so as to eliminate direct contact occurring between adjacent ones of said rolling members which could lead to unacceptably high frictional forces and heat and wear being generated, it has been conventional to provide a cage member fitted over said rolling members, portions of which are interposed between said rolling members.

Such a conventional cage member is effective for the above explained purpose, and is quite capable of retaining the rolling members at their prescribed relative positions, typically as equidistantly spaced around the circumferential direction of the annular space defined between said inner race member and said outer race member, but inevitably rubbing friction is generated between the rolling members where they touch such a cage member, and, if the cage member is able to come into contact with the inner race member or the outer race member, rubbing friction will be generated at this point also as the cage member is carried aroud the bearing as will inevitably happen. These rubbing or sliding frictional resistances increase the torque load which such a conventional rolling bearing improves upon a means rotating the shaft which said rolling bearing is supporting, and in particular in the high rotational speed operational range a considerable amount of heat can be generated by such rubbing or sliding friction, which not only causes loss of power, but also can excessively wear the contacting surfaces of the parts of the rolling bearing. In the worst case, if destruction of lubricant films which separate parts of the rolling bearing occurs, the durability of the bearing can be severely adversely affected.

SUMMARY OF THE INVENTION

Accordingly, there has become evident a requirement for an improved rolling bearing, in which substantially only rolling contact occurs, without the occurrence of any rubbing or sliding contact.

Thus, it is the primary object of the present invention to provide a rolling bearing, which avoids the various problems detailed above.

It is a further object of the present invention to provide such a rolling bearing, in which the contact between the rolling members thereof and the retaining means for said rolling members is a rolling contact.

It is a further object of the present invention to provide such a rolling bearing, which has good wear resistance.

It is a further object of the present invention to provide such a rolling bearing, which has good fatigue resistance.

It is a further object of the present invention to provide such a rolling bearing, which has good durability.

It is a further object of the present invention to provide such a rolling bearing, which does not impose an unduly high torque load upon a means rotating a shaft which said rolling bearing is supporting.

It is a further object of the present invention to provide such a rolling bearing, which does not cause undue power loss.

It is a further object of the present invention to provide such a rolling bearing, which is not liable to the undue generation of heat.

It is a yet further object of the present invention to provide such a rolling bearing, which has good lubrication characteristics.

It is a yet further object of the present invention to provide such a rolling bearing, which has good structural integrity.

It is a yet further object of the present invention to provide such a rolling bearing, which is capable of withstanding even a strong force acting between two of the bearing balls or rollers thereof in the relative direction to bias them together.

It is a yet further object of the present invention to provide such a rolling bearing, which is durable.

It is a yet further object of the present invention to provide such a rolling bearing, which can operate stably even at low rotational speed.

It is a yet further object of the present invention to provide such a rolling bearing, in the operation of which skewing of any of the component parts thereof is positively prevented.

It is a yet further object of the present invention to provide such a rolling bearing, which can operate reliably even at high rotational speed.

It is a yet further object of the present invention to provide such a rolling bearing, which can be satisfactorily lubricated by grease lubrication, even though it may rotate at high rotational speed.

It is a yet further object of the present invention to provide such a rolling bearing, which can be operated with low levels of noise.

It is a yet further object of the present invention to provide such a rolling bearing, which can be operated with low levels of vibration.

It is a yet further object of the present invention to provide such a rolling bearing, which can satisfactorily bear axial thrust.

According to the most general aspect of the present invention, these and other objects are attained by a rolling bearing, comprising: (a) an inner race member; (b) an outer race member; (c) a plurality of rolling members disposed between said inner race member and said outer race member and rotatably supporting said inner race member and said outer race member relative to one another; (d) a plurality of generally cylindrical rolling retainer members, one disposed between each adjacent pair of said rolling members, and each rolling on both of its said pair of adjacent rolling members and keeping them apart, each comprising: (d1) an axially central rolling portion, in rolling contact with both of said pair of adjacent rolling members; (d2) a pair of circumferential grooves, one proximate to each of its axial ends; and: (d3) a pair of disk shaped end portions, one proximate to each of its axial ends; (e) a pair of free rings, one at each axial end of said rolling bearing, and coaxial therewith; and: (f) a pair of cover members, one at each axial end of said rolling bearing, and each defining a support rail coaxial with said rolling bearing and being mounted to one of said race members; (g) said rolling retainer members rolling on the one radial sides of said support rails by their said disk shaped end portions, and on the other radial sides of said free rings by their said circumferential grooves into which said free rings are engaged. The rolling retainer members may roll on the radially outer sides of said support rails by their said disk shaped end portions, and on the radially inner sides of said free rings by their said circumferential grooves into which the inner peripheries of said free rings are engaged; or, alternatively, said rolling retainer members may roll on the radially inner sides of said support rails by their said disk shaped end portions, and on the radially outer sides of said free rings by their said circumferential grooves into which the outer peripheries of said free rings are engaged. The cover members may be mounted to said outer race member, or alternatively may be mounted to said inner race member. Optionally but desirably, a certain degree of play may be available in the radial direction for the support of said rolling retainer members between said support rails of said cover members and said free rings. Desirably, the center line of each of said rolling retainer members and the locuses of symmetry of the pair of said rolling members adjacent thereto may be all substantially coplanar. The central portion of the longitudinal cross sectional shape of each of said rolling retainer members may be concave facing outwards, and, in this case, the radius of curvature of said central portion of its longitudinal cross sectional shape may be greater, or alternatively may be less, than the radiuses of curvature of the longitudinal cross sectional shapes of the pair of said rolling members adjacent to it. The thickness of said free rings at their portions remote from where they contact said circumferential grooves of said rolling retainer members may optionally but desirably be greater than the thickness of said free rings at their portions proximate to where they contact said circumferential grooves of said rolling retainer members. Means may be provided for impelling lubricant through the space defined between said inner race member and said outer race member. The rolling members may be spherical balls, or alternatively may be rollers.

According to such a rolling bearing as specified above, since the retainers are rolling retainers, and all the contacts within the bearing are rolling contacts rather than some of them being sliding contacts as was the case in the prior art described above, thereby friction in the bearing is minimized, and this rolling bearing has good wear resistance and good fatigue resistance and durability, and further does not impose an unduly high torque load upon a means rotating a shaft which said rolling bearing is supporting, thus not causing undue power loss. Also, this rolling bearing is not liable to the undue generation of heat.

BRIEF DESCRIPTION OF THE DRAWINGS

The present invention will now be described with respect to the preferred embodiments thereof, and with reference to the illustrative drawings appended hereto, which however are provided for the purposes of explanation and exemplification only, and are not intended to be limitative of the scope of the present invention in any way, since this scope is to be delimited solely by the accompanying claims. With relation to the figures, spatial terms are to be understood as referring only to the orientation on the drawing paper of the illustrations of the relevant elements, unless otherwise specified; like reference symbols, unless otherwise so specified, denote the same parts and gaps and spaces and so on in the various figures relating to one preferred embodiment, and like parts and gaps and spaces and so on in figures relating to different preferred embodiments; and:

DESCRIPTION OF THE PREFERRED EMBODIMENTS

The present invention will now be described with reference to the preferred embodiments thereof, and with reference to the figures.

The First Preferred Embodiment

Figure 1:
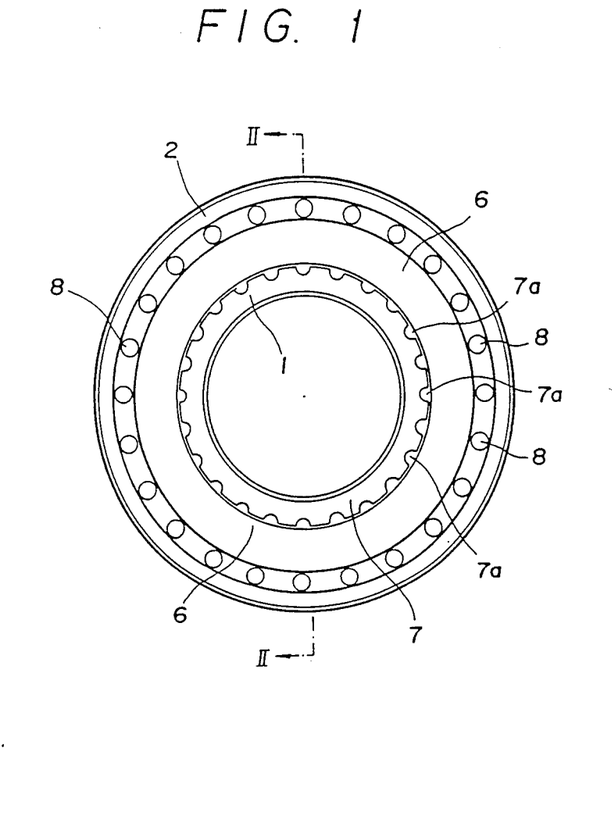
FIG. 1 is a side view showing the first preferred embodiment of the rolling bearing of the present invention, which is a ball bearing.
Figure 2:
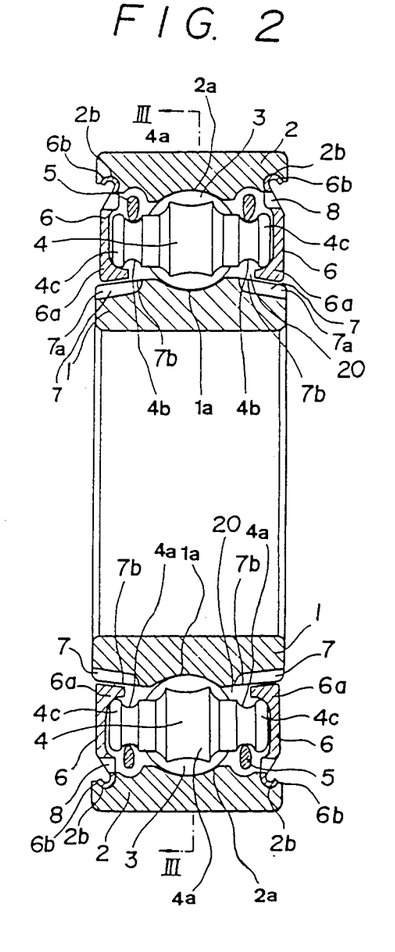
FIG. 2 is a longitudinal axial sectional view of said first preferred embodiment, taken in a plane shown by the arrows II—II in FIG. 1.
Figure 3:
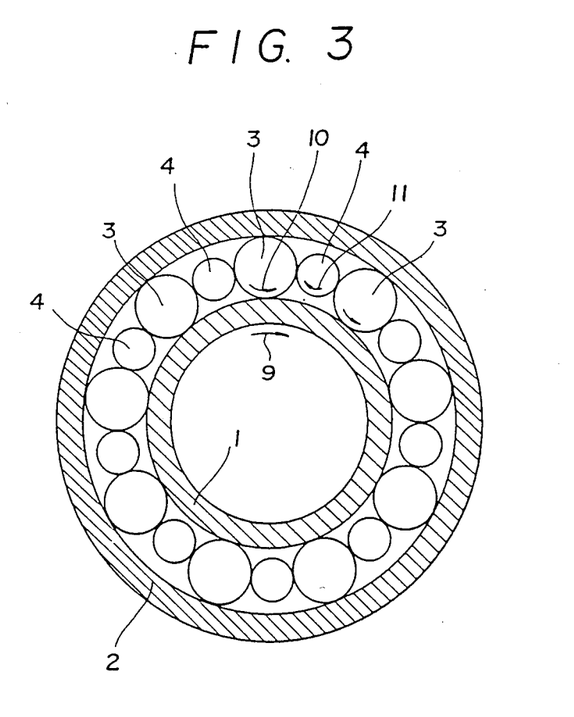
FIG. 3 is a transverse sectional view of said first preferred embodiment, taken in a plane shown by the arrows III—III in FIG. 2.

The first preferred embodiment of the rolling bearing of the present invention, in fact is constituted as a ball bearing rather than as a roller bearing. FIG. 1 is a side view showing the end on appearance of this first preferred embodiment ball bearing, while FIG. 2 is a longitudinal axial sectional view of said first preferred embodiment taken in a plane shown by the arrows II—II in FIG. 1 and FIG. 3 is a transverse sectional view thereof taken in a plane shown by the arrows III—III in FIG. 2. In these figures, the reference numeral 1 denotes an inner race member of the rolling bearing, which is formed in an annular shape; it is designed that, during the use of this rolling bearing, a shaft should be mounted into the central hole of this annular shaped inner race member 1 so as to pass through it, in order that said shaft should be rotatably supported by the bearing, but no such shaft is shown in the figures. Further, the reference numeral 2 denotes an outer race member of the rolling bearing, which is also formed in an annular shape; it is designed that, during the use of this rolling bearing, this annular shaped outer race member 2 should be supported in a suitable opening formed in a fixed member, in order that this bearing should be supported by said fixed member, but no such fixed member is shown in the figures either. The outer annular surface of the inner race member 1 is formed with an outer circumferential trough denoted as 1a which is substantially part circular in cross section, and similarly the inner annular surface of the outer race member 2 is formed with an inner circumferential trough denoted as 2a which is also substantially part circular in cross section. The inner race member 1 is fitted inside and substantialy coaxial with the outer race member 2, with their central transverse planes being substantially coincident in this first preferred embodiment; and a purality of bearing balls 3 are fitted between said inner race member 1 and said outer race member 2, said bearing balls 3 rolling in the outer circumferential trough 1a of the inner race member 1 and also rolling in the inner circumferential trough 2a of the outer race member 2. The bearing balls 3 are all of substantially the same diameter, and the radius of an annulus drawn around the outer race member 2 at the bottom of the inner circumferential trough 2a is substantially equal to the sum of the radius of an annulus drawn around the inner race member 1 at the bottom of the outer circumferential trough 1a plus the diameter of any one of said bearing balls 3, or more exactly in fact is very slightly greater than said sum so a certain amount of free play is left in the bearing structure. Accordingly, by virtue of their hardness and elasticity, the bearing balls 3 perform a function of positioning and rotatably supporting said inner and outer race members 1 and 2 with respect to one another while keeping them in their thus described relative positions as substantially coaxial with their central transverse planes substantially coincident; this much is per se known and conventional.

The number of the bearing balls 3 is considerably less than would be sufficient for filling, in the circumferential direction, the annular space between the inner race member 1 and the outer race member 2; in other words, when said bearing balls 3 are equidistantly spaced around said annular space between said inner andd outer race members 1 and 2, a substantial gap is present between each such bearing ball 3 and its two neighbors on its left and right sides, as seen in the FIG. 3 view for example. In order to maintain such equidistant spacing between said bearing balls 3, between each pair of neighboring bearing balls 3 there is fitted a member 4 which will herein be termed a rolling retainer member. The manner of fitting between one such rolling retainer member 4 and the two adjacent ones of the bearing balls 3 which said rolling retainer member 4 separates and the distance between which it maintains, according to this first preferred embodiment of the rolling bearing of the present invention, can be clearly seen in the schematic view of FIG. 4.

In detail, each of these rolling retainer members 4 is cylindrically symmetric, and comprises a central rolling portion 4a and two end portions. The central rolling portion 4a is formed, in this first preferred embodiment, as a waisted roller having its minimum diameter at its axially central portion and with its diameter increasing with axial distance away from its axial center, so that in longitudinal cross section said rolling retainer member 4 presents a part circular profile; in this first preferred embodiment, the radius of curvature of said part circular profile is substantially greater than the common radius of the bearing balls 3, so that each of the bearing balls 3 contacts each of the two of the rolling retainer members 4 adjacent to it at one contact point only, as clearly shown in FIG. 4. Further, each of the end portions of said rolling retainer member 4 is formed with a circumferential groove 4b and with a disk shaped end portion 4c longitudinally outward of said circumferential groove 4b.

Referring now back again to the views of FIGS. 1 and 2, the reference symbols 6 denote two annular cover members, one of which is fitted on each side of the annular space defined between the inner race member 1 and the outer race member 2. In this first preferred embodiment, each annular cover member 6 is thus mounted by a curled lip portion 6b formed at its outer circumferential portion being securely and tightly fitted into a groove 2b, of generally semi circular cross section, which is formed on the inner circumferential surface of the outer race member 2 at a substantially longitudinally extreme position thereon. And, in this first preferred embodiment, each annular cover member 6 is formed with an inwardly projecting cylindrical ring portion which defines a support rail 6a extending in the longitudinally inward direction of the rolling bearing from its radially inward edge.

The rolling retainer members 4 are kept aligned in their proper positions in this rolling bearing in the following manner, in this first preferred embodiment. On each side of each rolling retainer member 4, the disk shaped end portion 4c thereof rolls on the support rail 6a of the annular cover member 6 on that side of the rolling bearing, as shown in FIG. 2. Thereby the rolling retainer members 4 are kept from moving in the radially inward direction of the rolling bearing. Further, on each side of the rolling bearing, a flat annular ring member 5 is provided, engaged, as shown in FIG. 2, over the circumferential groove 4b of each of the rolling retainer members 4 on that side of the rolling bearing, on the radially outward side of said rolling retainer members 4 relative to the central axis of the rolling bearing. In this first preferred embodiment, the transverse cross section of the annular ring members 5 is substantially rectangular, so that annular ring members 5 are of substantially the same thickness at their radially outward portions as at their radially inward portions. Thereby the rolling retainer members 4 are kept from moving in the radially outward direction of the rolling bearing. The outer diameter of each of the support rails 6a is set to be slightly smaller than the envelope traced by the innermost points of the disk shaped end portions 4c of the rolling retainer members 4 as they rotate around the rolling bearing, so that a slight play exists between said support rails 6a and said rolling retainer members 4—since in the operating condition of this bearing centrifugal force naturally forces the rolling retainer member 4 in the radially outwards direction so that their circumferential grooves 4b bear against and roll on the inner peripheral edges of the annular ring members 5, without any substantial sliding occurring between said rolling retainer members 4 and said inner peripheral edges of said annular ring members 5.

Now the arrangements for providing lubrication, which constitute a useful specialization of this first preferred embodiment of the rolling bearing of the present invention, will be described. On each side of the rolling bearing, the longitudinal end portion of the circumferential inner surface of the inner race member 1 is formed with a pluarlity of circumferential equally spaced lubrication intake notches which extend substantially parallel to the central axis of the bearing, vanes 7 thereby being defined between these lubrication intake notches, and lubrication inlets 7a being defined at the ends of said lubrication intake notches which open to the outside, while lubrication outlets 7b are defined at the inner ends of said lubrication intake notches which open to the interior space of the bearing, denoted as 20 and defined between the inner race member 1 and the outer race member 2, in which the bearing balls 3 and the rolling retainer members 4 rotate, longitudinally inwards of the curled lip portions 6b of the annular cover members 6. And, further, through the radially outer flat annular portion of each of the annular cover members 6 there are formed a plurality of circumferentially equally spaced lubrication outlet apertures 8 which open from said space 20 to the outside of the rolling bearing. Thereby, when this rolling bearing is rotating and particularly the inner race member 1 thereof is rotating, lubrication present at the outside of said bearing is sucked in through the lubrication inlets 7a, is passed through the lubrication intake notches, and is expelled out through the lubrication outlets 7b to the internal space 20 of the bearing, thereby to lubricate the rotating parts therein including the bearing balls 3 and the rolling retainer members 4 and the annular ring members 5, and then is expelled through the lubrication outlet apertures 8 back to the outside of the bearing; and this flow is maintained by the operation of centrifugal force. In this first preferred embodiment of the rolling bearing of the present invention, the lubrication intake notches and the lubrication outlet apertures 8 are provided, in plurality, on both sides of the bearing; but this is not intended to be limitative of the present invention, and, depending upon how the lubrication is intended to be circulated, it would alternatively be possible to provide said lubrication intake notches and said lubrication outlet apertures 8 only on one side of the bearing.

Operation of this Rolling Bearing

This rolling bearing operates as follows. When the outer race member 2 is mounted into some fixed member, not particularly shown, so as not to be rotatable, and a shaft, also not particularly shown, which it is desired rotatably to support is fitted through the inner race member 1 so as to be tightly mounted therein, and then said shaft is rotated in the direction indicated by the arrow 9 in FIG. 3, i.e. said shaft is rotated in the clockwise rotational direction from the point of view of that figure, and carries the inner race member 1 along with it, then the bearing balls 3, which are supported between said inner race member 1 and said outer race member 2, roll without slipping on said inner and outer race members 1 and 2, each rotating in the anticlockwise rotational direction as shown by the arrow 10 in FIG. 3 while also being carried around the central axis of the construction in the clockwise rotational direction; and the bearing balls 3 support the inner race member 1 from the outer race member 2 during this rotation. The circumferential positions of the bearing balls 3 are maintained by the interposition of one of the rolling retainer members 4 between each adjacent pair of said bearing balls 3, and accordingly said rolling retainer members 4 roll without slipping on said bearing balls 3, each rotating in the clockwise rotational direction as shown by the arrow 11 in FIG. 3 while also being carried around the central axis of the construction in the clockwise rotational direction. Further, the positions of the rolling retainer members 4: in the circumferential direction of the construction, are maintained by the interposition of the bearing balls 3 between said rolling retainer members 4; in the outward radial direction of the construction, are maintained by the circumferential grooves 4b of said rolling retainer members 4 being constrained by rolling without any substantial slippage on the inner peripheral edges of the annular ring members 5; and, in the inward radial direction of the construction, are maintained by the disk shaped end portions 4c of said rolling retainer members 4 being constrained by rolling without any substantial slippage on the support rails 6a of the annular cover members 6. In other words, the rolling retainer members 4 rotate as a group about the central axis of the construction along with the bearing balls 3, while at the same time each of said rolling retainer member 4 rotates about its own axis of symmetry.

Because each of the two annular ring members 5 is engaged over the circumferential grooves 4b of all of the rolling retainer members 4 on its side of the construction, and is supported by said circumferential grooves 4b, thereby said two annular ring members 5 are held in place and are prevented from any substantial movement in the axial direction of the rolling bearing construction. In this connection, each of said annular ring members 5 is subjected to tensile force by virtue of centrifugal force, not only by virtue of its own weight, but also by virtue of the weight of the rolling retainer members 4. In practice, during use of this rolling bearing, since the outer diameter of each of the support rails 6a is set to be slightly smaller than the envelope traced by the innermost points of the disk shaped end portions 4c of the rolling retainer members 4 as they rotate around the bearing, therefore the rolling retainer members 4 are positioned towards the radially outwards direction, so that their circumferential grooves 4b bear relatively hard against the inner peripheral edges of the annular ring members 5 while rolling on them without any substantial sliding occurring therebetween, while on the other hand the disk shaped end portions 4c of said rolling retainer members 4 tend to float over the support rails 6a of the annular cover members 6, or at least do not bear on said support rails 6a with any very substantial force; thus, although the contact of each of said disk shaped end portions 4c of said rolling retainer member 4 with its one of the support rails 6a is a point contact, nevertheless no substantial slippage will occur between said rolling retainer members 4 and said support rails 6a, and they reliably and lightly roll on one another while reliably aligning the central axes of said rolling retainer members 4 to be parallel with the central axis of the rolling bearing construction.

Since, as described above, in this first preferred embodiment the radius of curvature of the part circular profile of the central rolling portion 4a of each of the rolling retainer members 4 is substantially greater than the common radius of the bearing balls 3, so that each of the bearing balls 3 contacts each of the two of the rolling retainer members 4 adjacent to it at one contact point only, thereby the rolling resistance between said bearing balls 3 and said rolling retainer members 4 is minimized; and, further, when this rolling bearing is operated at relatively high rotational speed and the rolling retainer members 4 are biased in the radially outward direction of the construction by centrifugal force, the central axial lines of said rolling retainer members 4 are always maintained as parallel to the central axial line of the entire construction (the central axis of the inner race member 1), and the occurrence of skewing between said axes is prevented.

A rolling bearing of this type is typically used as a bearing for a turbo compressor or the like which is coupled to a drive motor, and is often used in an enclosed environment which is filled with fluid. In such an application, as the vanes 7 provided on either side of the inner race member 1 rotate, this fluid, which typically consists of a mixture of liquefied gas and lubricant, is sucked in through the lubrication inlets 7a, is passed past the vanes 7 through the lubrication intake notches, and is expelled out through the lubrication outlets 7b to the internal space 20 of the bearing, thereby to lubricate the rotating parts therein including the bearing balls 3 and the rolling retainer members 4 and the annular ring members 5 and the support rails 6a, and then is expelled through the lubrication outlet apertures 8 back to the outside of the bearing; and this flow is maintained by the operation of centrifugal force. Thus, provided that said fluid contains a proportion of lubricant, lubrication of the various parts of this rolling bearing occurs automatically. Thereby, since lubricant films are formed over all the contact points and areas within the bearing construction, not only is the friction inevitably entailed by the rolling of the various parts over one another minimized, thereby maximizing the durability of these parts and of the rolling bearing as a whole, but also the cushioning effect of these lubricant films causes the actions of self alignment and self adjustment of the rolling retainer member 4 to be even more softly and gently performed. Further, since the lubricant films between the bearing balls 3, the rolling retainer members 4, and the annular ring members 5 substantially fill all the gaps between the mutually contacting parts and apply gentle pressure thereto, and accordingly the play between the various parts is reduced or eliminated, therefore the operation of the bearing is quietened, and the noise and the vibration engenderd thereby are minimized. The operation of the bearing may be made even smoother, if the material of which the rolling retainer members 4 are made is selected to be wear resistant and light yet elastic.

Thus, it is seen that, in this rolling bearing construction, all of the contacts between mutually moving parts are rolling contacts, rather than some of them being sliding contacts as was the case in the prior art as described earlier in this specification; and, hence, friction in the operation of the bearing is minimized, as compared with the prior art, and this rolling bearing has good wear resistance and good fatigue resistance and durability, and further does not impose an unduly high torque load upon a means rotating a shaft which said rolling bearing is supporting, thus not causing undue power loss. Also, this rolling bearing is not liable to the undue generation of heat. And, according to the lubrication structure shown, this rolling bearing has good lubrication characteristics.

The Second Preferred Embodiment

Figure 5:
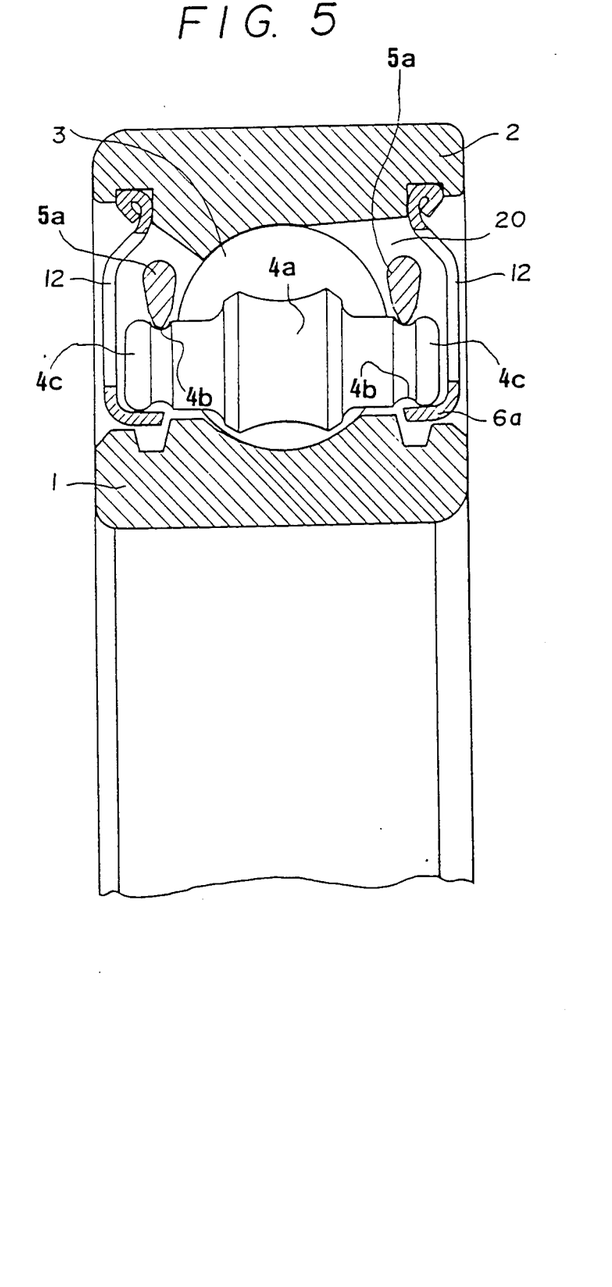
FIG. 5 is a longitudinal axial sectional view, similar to a portion of FIG. 2 but enlarged, showing a crucial portion of the second preferred embodiment of the rolling bearing of the present invention, in which certain annular ring members are thicker in their radially outer cross sections, than in the first preferred embodiment.

Next, with regard to FIG. 5, which is a longitudinal axial sectional view similar to a portion of FIG. 2 but enlarged, the second preferred embodiment of the rolling bearing of the present invention will be described. It should be understood that, in FIG. 5, like reference symbols to reference symbols in previous figures relating to the first preferred embodiment correspond to like elements. In this second preferred embodiment, the differences from the first preferred embodiment described and illustrated above are as follows.

First, the transverse cross section of the annular ring members 5, rather than being a substantially rectangular cross section as was the case in the first preferred embodiment, is substantially thicker at its radially outward portions than at its radially inward portions, so that, while the rolling contact between the circumferential grooves 4b of the rolling retainer members 4 and the inner peripheral edges of said annular ring members 5 is not impeded, nevertheless the tensile resistance, i.e. the resistance of said annular ring members 5 to being stretched, as will occur during the use of this rolling bearing when the radially outwardly biasing action of centrifugal force upon said annular ring members 5 themselves and also upon the rolling retainers member 4 which are required to be radially restrained by said annular ring members 5 acts to stretch said annular ring members 5, is much improved. Accordingly this rolling bearing is capable of bearing higher loads than is the rolling bearing of the first preferred embodiment.

Further, this second preferred embodiment is provided with no such elaborate lubrication arrangements as was the first preferred embodiment described above. In fact, this bearing is an open type bearing, and has large diameter openings 12 provided through the annular cover members 6 to open to the space defined between the inner race member 1 and the outer race member 2, so that, as opposed to the case with the first preferred embodiment, oil mist lubrication can take place spontaneously through said large diameter openings 12.

Yet further, in this second preferred embodiment, the contact region between the disk shaped end portions 4c of the rolling retainer members 4 and the support rails 6a of the annular cover members 6 is not substantially a point, as was the case in the first preferred embodiment, but is a line shaped region which is substantially parallel with the central axis of each of said region retainer members 4. As a result of this feature, the support rails 6a are suitably adapted to keep the rolling retainer members 4 from moving as a group, and, due to the cushioning effect of the lubricant films that are present between the various moving parts of the construction, the rotational axes of the rolling retainer members 4 are automatically aligned in a gentle and soft manner.

Apart from these matters, this second preferred embodiment of the rolling bearing of the present invention is constructed in substantially the same member, as is the first preferred embodiment, and the same benefits and advantages are obtained with this second preferred embodiment, as with said first.

General Constructional Concept

Figure 6:
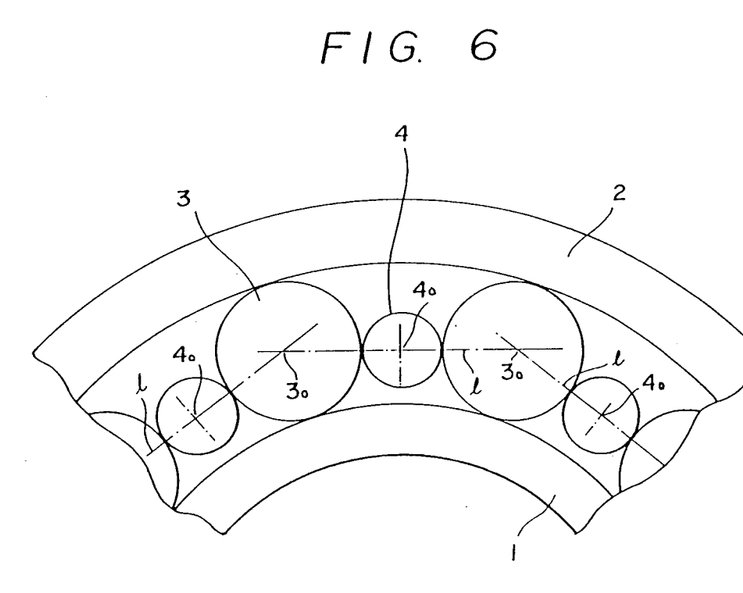
FIG. 6 is a schematic view for illustrating a constructional concept applicable to all of the preferred embodiments, and is similar to a portion of FIG. 3, being taken in substantially the same cross sectional plane, but is enlarged.

FIG. 6 is a schematic view for illustrating a constructional concept applicable to all of the preferred embodiments. This FIG. 6 is similar to a portion of FIG. 3, and is taken in substantially the same cross sectional plane, but is enlarged. This illustrates the concept that, for best performance, the central axis of each of the rolling retainer members 4—denoted by the symbols $4_o$—and the two central points—denoted by the symbols $3_o$—of the two bearing balls 3 adjacent to said rolling retainer member 4 which it bears against, should be coplanar; typical such common planes are indicated by the symbols "1" in the figure. This construction ensures that, even if a relatively great sudden force impels two neighboring ones of the bearing balls 3 in the relative direction towards one another, this force merely pinches the one of the rolling retainer members 4 which is between said bearing balls 3 so as to squeeze said rolling retainer member 4, and does not tend to expel said rolling retainer member 4 from between said two bearing balls 3. Accordingly, the trajectory of said rolling retainer member 4, and the rotation thereof, are not substantially disturbed, and therefore the structural integrity of the rolling bearing as a whole is maximized.

This constructional concept can be applied to any of the various preferred embodiments of the present invention which are described in this specification.

The Third Preferred Embodiment

Figure 4:
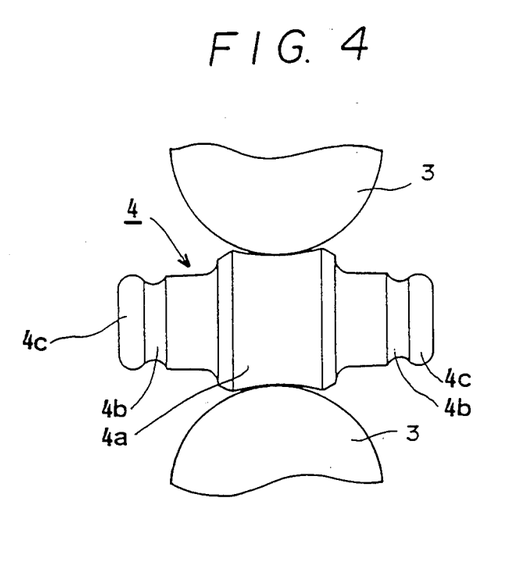
FIG. 4 is a schematic view showing how one of the rolling retainer members thereof fits and rollingly contacts between two adjacent ones of the ball bearings thereof, in this first preferred embodiment in which the radius of curvature of the longitudinal cross section of said rolling retainer member is greater than the radius of curvature of said adjacent ball bearings.
Figure 7:
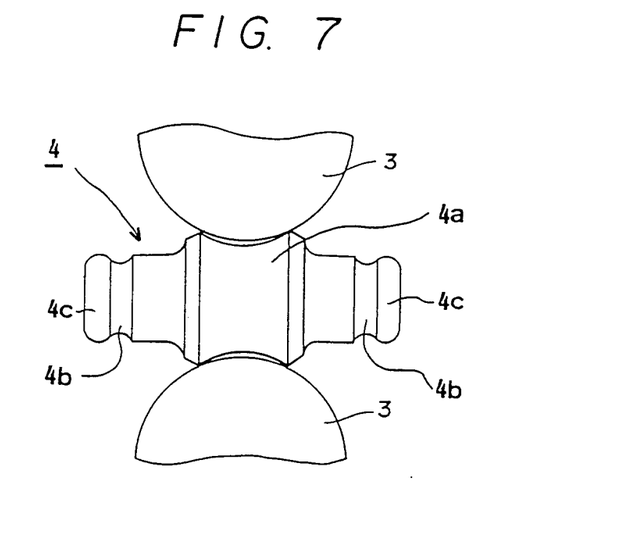
FIG. 7 is a schematic view, similar to FIG. 4 but relating to the third preferred embodiment of the rolling bearing of the present invention, showing how one of the rolling retainer members thereof fits and rollingly contacts between two adjacent ones of the ball bearings thereof, in this third preferred embodiment in which the radius of curvature of the longitudinal cross section of said rolling retainer member is smaller than the radius of curvature of said adjacent ball bearings.

Next, with regard to FIG. 7, which is a schematic view similar to FIG. 4, the third preferred embodiment of the rolling bearing of the present invention will be described. It should be understood that, again in FIG. 7, like reference symbols to reference symbols in previous figures relating to the first and the second preferred embodiments correspond to like elements. In this third preferred embodiment, as before, for each of the rolling retainer members 4, its central rolling portion 4a is formed as a waisted roller having its minimum diameter at its axially central portion and with its diameter increasing with axial distance away from its axial center, so that in longitudinal cross section said rolling retainer member 4 presents a part circular profile. However, in this third preferred embodiment, the difference from the first preferred embodiment described and illustrated above is that, the radius of curvature of said part circular profile is substantially smaller than the common radius of the bearing balls 3, so that each of the bearing balls 3 now contacts each of the two of the rolling retainer members 4 adjacent to it at two contact points, as clearly shown in FIG. 7. According to this construction concept, the rotational axes of the rolling retainer members 4 are automatically aligned to be substantially parallel to the central axis of the construction in a sure and stable manner, even when this rolling bearing is operating at a low rotational speed, and the occurrence of skewing is positively prevented.

Apart from these matters, this third preferred embodiment of the rolling bearing of the present invention is constructed in substantially the same manner, as is the first preferred embodiment, and the same benefits and advantages are obtained with this third preferred embodiment, as with said first.

The Fourth Preferred Embodiment

Figure 8:
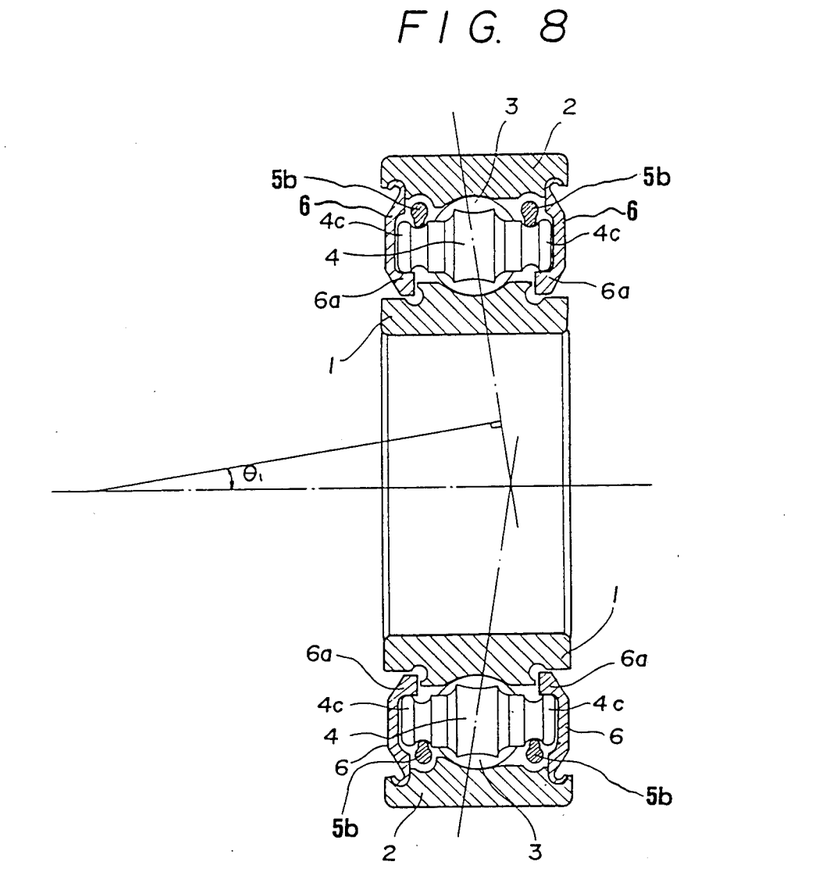
FIG. 8 is a longitudinal axial sectional view, similar to FIG. 2 but relating to the fourth preferred embodiment of the rolling bearing of the present invention, taken in a sectional plane similar to the sectional plane of FIG. 2.

Next, with regard to FIG. 8, which is a longitudinal axial sectional view similar to FIG. 2 and is taken in a sectional plane similar to the sectional plane of FIG. 2, the fourth preferred embodiment of the rolling bearing of the present invention will be described. It should be understood that, again in FIG. 8, like reference symbols to reference symbols in previous figures relating to the first through the third preferred embodiments correspond to like elements. In this fourth preferred embodiment, as in the case of the second preferred embodiment, grease lubrication is relied upon, and the annular ring members 5 are constructed with their radially outward portions substantially thicker than their radially inward portions, so as to be able to withstand a high level of tensile force. However this fourth preferred embodiment is a shielded type bearing, which is still capable of being lubricated by grease lubrication because the fact that all of the contacts between members within the bearing are rolling contacts rather than sliding contacts ensures that, even at high rotational speeds, not too much heat is generated within the bearing to be properly dissipated without causing undue harm to the bearing as a whole. Accordingly, deterioration of the materials of which the various parts of this rolling bearing is made can be avoided, even at high rotational speed, and durability of the bearing is ensured. Also, this fourth preferred embodiment is an angular contact type bearing, as indicated by the angle $theta_1$ illustrated, and therefore can bear a certain amount of end thrust. Since, in the case of this fourth preferred embodiment, the angular contact angle $theta_1$ is relatively small, in the construction it has still been practiced to keep the rotational axes of the rolling retainer members 4 aligned to be substantially parallel to the central axis of the construction, just as in the other preferred embodiments discussed above. Also, as in the case of the second preferred embodiment, it has been arranged for the contact regions between the disk shaped rod portions 4c of the rolling retainer members 4 and the support rails 6a of the annular cover members 6 to be line shaped regions which are substantially parallel with the central axes of said rolling retainer members 4, so that, as before, said support rails 6a are suitably adapted to keep the rolling retainer members 4 from moving as a group, and, due to the cushioning effect of the lubricant films that are present between the various moving parts of the construction, the rotational axes of said rolling retainer members 4 are automatically aligned in a gentle and soft manner, even at a high rotational speed. Apart from these manners, this fourth preferred embodiment of the rolling bearing of the present invention is constructed in substantially the same manner, as is the second preferred embodiment, and the same benefits and advantages are obtained with this fourth preferred embodiment, as with said second.

The Fifth Preferred Embodiment

Figure 9:
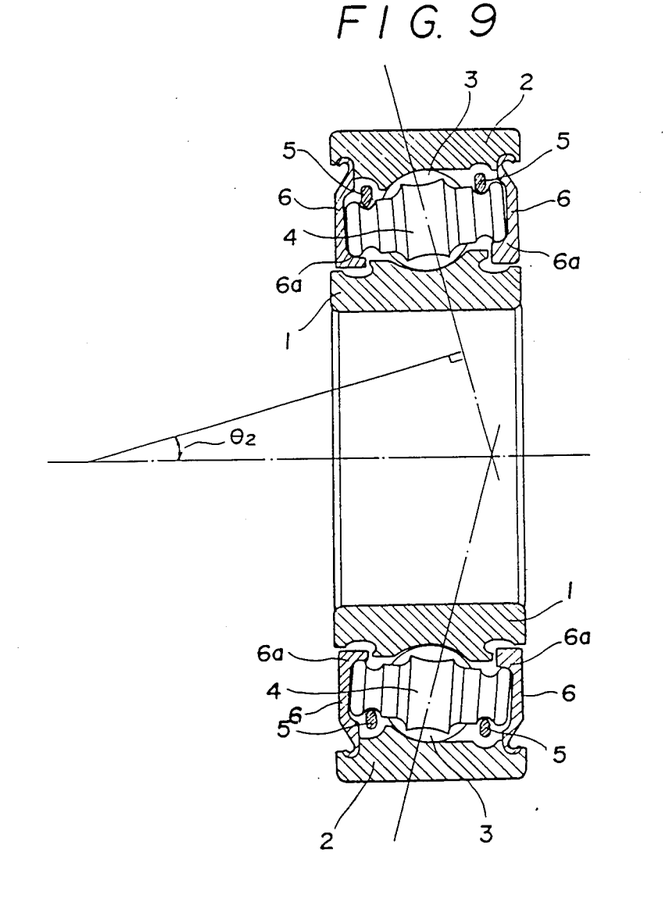
FIG. 9 is a longitudinal axial sectional view, similar to FIG. 2 and 8 but relating to the fifth preferred embodiment of the rolling bearing of the present invention, taken in a sectional plane similar to the sectional planes of FIGS. 2 and 8.

Next, with regard to FIG. 9, which is a longitudinal axial sectional view similar to FIGS. 2 and 8 and is taken in a sectional plane similar to the sectional planes of said figures, the fifth preferred embodiment of the rolling bearing of the present invention will be described. It should be understood that, again in FIG. 9, like reference symbols to reference symbols in previous figures relating to the first through the fourth preferred embodiments correspond to like elements. This fifth preferred embodiment, like the fourth preferred embodiment, is an angular contact type bearing and therefore can bear end thrust; but, as indicated by the angle theta$_2$ illustrated which by contrast to said fourth preferred embodiment is relatively large, the thrust which this fifth preferred embodiment is intended to bear during use is relatively greater, than in the case of said fourth preferred embodiment. Accordingly, in this construction, it has been practiced to angle the rotational axes of the rolling retainer members 4 at a certain characteristic angle to the central axis of the construction, by contrast to the case of the other preferred embodiments discussed above. As before, the rolling retainer members 4 roll in smooth contact with the support rails 6a, so as to provide smooth operation at low levels of noise and vibration. In this manner, even when operated at a high rotational speed, this fifth preferred embodiment can be lubricated by grease lubrication. Apart from these matters, this fifth preferred embodiments of the rolling bearing of the present invention is constructed in substantially the same manner, as is the fourth preferred embodiment, and the same benefits and advantages are obtained with this fifth preferred embodiment, as with said fourth.

The Sixth Preferred Embodiment

Figure 10:
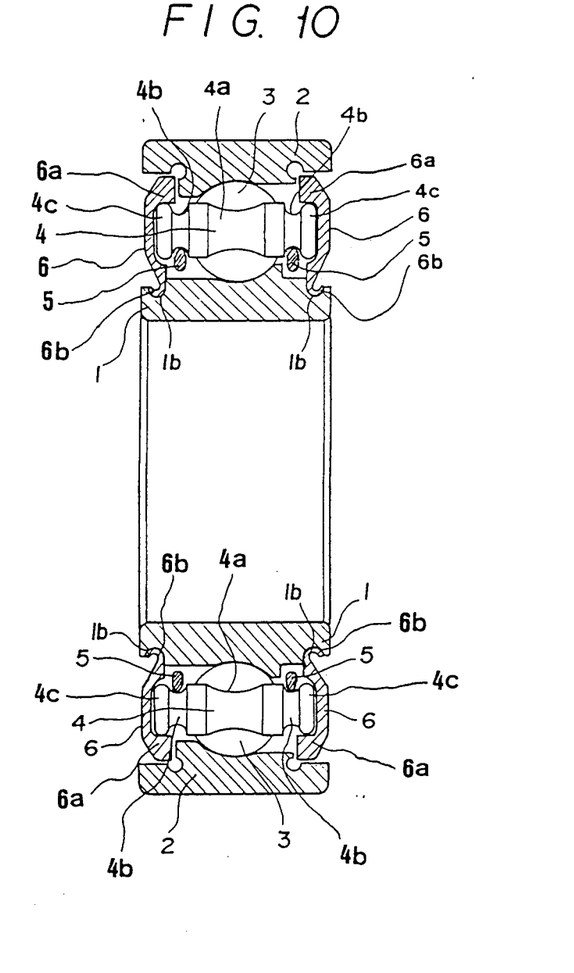
FIG. 10 is a longitudinal axial sectional view, similar to FIGS. 2, 8 and 9 but relating to the sixth preferred embodiment of the rolling bearing of the present invention, taken in a sectional plane similar to the sectional planes of FIGS. 2, 8, and 9.

Next, with regard to FIG. 10, which is a longitudinal axial sectional view similar to FIGS. 2, 8, and 9 and is taken in a sectional plane similar to the sectional planes of said figures, the sixth preferred embodiment of the rolling bearing of the present invention will be described. It should be understood that, again in FIG. 10, like reference symbols to reference symbols in previous figures relating to the first through the fifth preferred embodiments correspond to like elements. The construction in this sixth preferred embodiment is reversed by comparison with the first preferred embodiment, although embodying the same basic conceptual principle, according to the present invention. This construction will therefore now be described in detail.

In detail, in this sixth preferred embodiment, the inner race member 1 and the outer race member 2 are constructed in substantially the same way as in the first preferred embodiment described above, except that the outer circumferential trough 1A on the inner race member 1 and the inner circumferential trough 2A on the outer race member 2 are constructed in axially asymmetrical fashion, so that this rolling bearing should be able to withstand a certain amount of axial thrust; and that, rather than the outer race member 2 being formed on its inner circumferential surface with the grooves 2b at substantially longitudinally extreme positions thereon as was the case in said first preferred embodiment, by contrast in this sixth preferred embodiment it is the inner race member 1 which is formed on its outer circumferential surface with grooves 1b of generally semi circular cross section at substantially longitudinally extreme positions thereon. Also, no flow type lubrication facilities such as the lubrication inlets 7a and so on are provided. In this sixth preferred embodiment, the rolling retainer members 4 are formed substantially as in the case of the first preferred embodiment, only with some dimensional differences, and said rolling retainer members 4 are fitted between the bearing balls 3 just as before.

On the other hand, in this sixth preferred embodiment, the two annular cover members 6, one of which is as before fitted on each side of the annular space defined between the inner race member 1 and the outer race member 2, are mounted by their curled lip portions 6b which are now formed at their inner circumferential portions, now into the grooves 1b formed on the outer circumferential surface of the inner race member 1 at substantially longitudinally extreme positions thereon. In this sixth preferred embodiment, each annular cover member 6 is formed with its inwardly projecting cylindrical ring portion which defines the support rail 6a, now extending from its radially outward edge in the longitudinally inward direction of the rolling bearing.

Thus, the rolling retainer members 4 are kept aligned in their proper positions in this rolling bearing in the following manner, kin this sixth preferred embodiment. On each side of each rolling retainer member 4, the disk shaped end portion 4c thereof rolls on the support rail 6a of the annular cover member 6 on that side of the rolling bearing, now on the radially inside side of said support rail 6a. Thereby the rolling retainer members 4 are kept from moving in the radially outward direction of the rolling bearing. Further, on each longitudinal side of the rolling bearing, a flat annular ring member 5 is provided as engaged into the circumferential groove 4b of each of the rolling retainer members 4 on that side of the rolling bearing, now on the radially inward side of said rolling retainer member 4 relative to the central axis of the rolling bearing. In this sixth preferred embodiment, as in the first preferred embodiment, the transverse cross section of the annular ring members 5 is substantially rectangular, so that annular ring members 5 are of substantially the same thickness at their radially outward portions as at their radially inward portions. Thereby the rolling retainer members 4 are kept from moving in the radially inward direction of the rolling bearing.

The outer diameter of each of the annular ring members 5 is set to be slightly smaller than the envelope traced by the innermost points of the bottoms of the circumferential grooves 4b of the rolling retainer members 4 as they rotate around the rolling bearing, so that a slight play exists between said annular ring members 5 and said rolling retainer members 4—since in the operating condition of this bearing centrifugal force naturally forces the rolling retainer members 4 in the radially outwards direction so that their disk shaped end portions 4c bear against and roll on the inner peripheries of the support rails 6a, without any substantial sliding occurring between said rolling retainer members 4 and said support rails 6a.

Operation of this Rolling Bearing

This sixth preferred embodiment type rolling bearing operates similarly to the first preferred embodiment, and the circumferential positions of the bearing balls 3 are maintained by the interposition of one of the rolling retainer members 4 between each adjacent pair of said bearing balls 3, and accordingly said rolling retainer members 4 roll without slipping on said bearing ball 3. The positions of the rolling retainer members 4: in the circumferential direction of the construction, are maintained by the interposition of the bearing balls 3 between said rolling retainer members 4; in the inward radial direction of the construction, are maintained by the circumferential grooves 4b of said rolling retainer members 4 being constrained by rolling without any substantial slippage on the outer peripheral edges of the annular ring members 5; and, in the outward radial direction of the construction, are maintained by the disk shaped end portions 4c of said rolling retainer members 4 being constrained by rolling without any substantial slippage on the support rails 6a of the annular cover members 6. In other words, as before, the rolling retainer members 4 rotate as a group about the central axis of the construction along with the bearing balls 3, while at the same time each of said rolling retainer member 4 rotates about its own axis of symmetry. As before, because each of the two annular ring members 5 is engaged into the circumferential grooves 4b of all of the rolling retainer members 4 on its side of the construction, and is supported by said circumferential grooves 4b, thereby said two annular ring members 5 are held in place and are prevented from any substantial movement in the axial direction of the rolling bearing construction. In this sixth preferred embodiment, each of said annular ring members 5 is not subjected to any very great force, while on the other hand the support rails 6a of the annular cover members 6 are subjected to fairly high forces due to centrifugal force, by virtue of the weight of the rolling retainer members 4.

Apart from these matters, this sixth preferred embodiment of the rolling bearing of the present invention is constructed in substantially the same manner, as is the first preferred embodiment, and the same benefits and advantages are obtained with this sixth preferred embodiment, as with said first.

Conclusion

As a matter of course, the various concepts discussed with regard to the various preferred embodiments disclosed above could be utilized in different combinations from those shown. All such variations should be considered as being within the scope of the present invention. For example, a reversed type of construction as shown in the case of the sixth preferred embodiment could be embodied as an angular contact type of ball or roller bearing, and could be shielded and grease lubricated, so as to be capable of high speed operation, or alternatively could be lubricated by the means including the lubrication inlets 7a and the vanes and so on utilized in the case of the first preferred embodiment. Further, the concept shown in FIG. 6 and discussed above—of arranging the central axis of each of the rolling retainer members 4 and the centers of the two bearing balls, or the central axes of the two bearing rollers, adjacent to said retainer member 4, to be coplanar—could be applied to any of the shown preferred embodiments, including the sixth preferred embodiment which had the reversed type construction. Further, the principle as illustrated in FIG. 4—that the radius of curvature of the part circular longitudinal cross sectional profile of each of the rolling retainer members 4 is substantially greater than the common radius of the bearing balls 3—or alternatively the principle as illustrated in FIG. 7—that the radius of curvature of the part circular longitudinal cross sectional profile of each of the rolling retainer members 4 is substantially smaller than the common radius of the bearing balls 3—can be applied to any one of the preferred embodiments shown. Equally, the principle incorporated in the second embodiment—that the transverse cross section of the annular ring members 5 is substantially thicker at its portions farther away from the circumferential grooves 4b of the rolling retainer members 4 than at portions engaged into said circumferential grooves 4b, so that the tensile resistance of said annular ring members 5 is improved—can be applied to any one of the preferred embodiments shown.

It is acceptable, according to the principles of the present invention, if the constructional details of the system are varied, although the shown ones are considered to be preferred. For example, the rolling members of the bearing could, in other embodiments, be bearing rollers, rather than being bearing balls like the bearing balls 3 utilized for the shown preferred embodiments. Other modifications could also be conceived of. Therefore, although the present invention has been shown and described in terms of the preferred embodiments thereof, and with reference to the appended drawings, it should not be considered as being particularly limited thereby, since the details of any particular embodiment, or of the drawings, could be varied without, in many cases, departing from the ambit of the present invention. Accordingly, the scope of the present invention is to be considered as being delimited, not by any particular perhaps entirely fortuitous details of the disclosed preferred embodiments, or of the drawings, but solely by the scope of the accompanying claims, which follow.

What is claimed is:

1. A rolling bearing, comprising:
   (a) an inner race member;
   (b) an outer race member;
   (c) a plurality of rolling members disposed between said inner race member and said outer race member and rotatably supporting said inner race member and said outer race member relative to one another;
   (d) a plurality of generally cylindrical rolling retainer members, one disposed between each adjacent pair of said rolling members, and each rolling on both of its said pair of adjacent rolling members and keeping them apart, each comprising:
   (d1) an axially central rolling portion, in rolling contact with both of said pair of adjacent rolling members;
   (d2) a pair of circumferential grooves, one proximate to each of its axial ends; and:
   (d3) a pair of disk shaped end portions, one proximate to each of its axial ends;
   (e) a pair of free rings, one at each axial end of said rolling bearing, and coaxial therewith; and:
   (f) a pair of cover members, one at each axial end of said rolling bearing, and each defining a support rail coaxial with said rolling bearing and being mounted to one of said race members;
   (g) said rolling retainer members each rolling on one radial side of said support rails by their disk shaped end portions, and on the other radial side of said free rings by their circumferential grooves into which said free rings are engaged;
   (h) the central rolling portion of each of said rolling retaining members being concaved facing outwards and having a radius of curvature in a longitudinal direction which is less than the radii of curvature of the adjacent pair of said rolling members in the longitudinal direction.

2. A rolling bearing according to claim 1, wherein said rolling retainer members roll on the radially outer sides of said support rails by their said disk shaped end portions, and on the radially inner sides of said free rings by their said circumferential grooves into which the inner peripheries of said free rings are engaged.

3. A rolling bearing according to claim 2, wherein said cover members are mounted to said outer race member.

4. A rolling bearing according to claim 1, wherein said rolling retainer members roll on the radially inner sides of said support rails by their said disk shaped end portions, and on the radially outer sides of said free rings by their said circumferential grooves into which the outer peripheries of said free rings are engaged.

5. A rolling bearing according to claim 4, wherein said cover members are mounted to said inner race member.

6. A rolling bearing according to any one of claims 1 through 5, wherein a certain degree of play is available in the radial direction for the support of said rolling retainer members between said support rails of said cover members and said free rings.

7. A rolling bearing according to any one of claims 1 through 5, wherein the center line of each of said rolling retainer members and the locuses of symmetry of the pair of said rolling members adjacent thereto are all substantially coplanar.

8. A rolling bearing according to claims 1 through 5, wherein the thickness of said free rings at their portions remote from where they contact said circumferential grooves of said rolling retainer members is greater than the thickness of said free rings at their portions proximate to where they contact said circumferential grooves of said rolling retainer members.

9. A rolling bearing according to any one of claims 1 through 5, further comprising means for impelling lubricant through the space defined between said inner race member and said outer race member.

10. A rolling bearing according to any one of claims 1 through 5, wherein said rolling members are spherical balls.

* * * * *